(12) United States Patent
Abu Antoun et al.

(10) Patent No.: US 11,999,035 B2
(45) Date of Patent: Jun. 4, 2024

(54) WORKING TOOL

(71) Applicant: Hilti Aktiengesellschaft, Schaan (LI)

(72) Inventors: Chafic Abu Antoun, Buchs (CH); Florian Schmid, Buchs SG (CH); Albert Binder, Buchs (CH); Manuel Gut, Göfis (AT)

(73) Assignee: HILTI AKTIENGESELLSCHAFT, Schaan (LI)

( * ) Notice: Subject to any disclaimer, the term of this patent is extended or adjusted under 35 U.S.C. 154(b) by 190 days.

(21) Appl. No.: 17/783,388

(22) PCT Filed: Dec. 9, 2020

(86) PCT No.: PCT/EP2020/085295
§ 371 (c)(1),
(2) Date: Jun. 8, 2022

(87) PCT Pub. No.: WO2021/122228
PCT Pub. Date: Jun. 24, 2021

(65) Prior Publication Data
US 2023/0027749 A1 Jan. 26, 2023

(30) Foreign Application Priority Data
Dec. 20, 2019 (EP) ..................................... 19218924

(51) Int. Cl.
*B25C 1/06* (2006.01)
*H02K 33/12* (2006.01)
*H02P 25/06* (2016.01)

(52) U.S. Cl.
CPC .............. *B25C 1/06* (2013.01); *H02K 33/12* (2013.01); *H02P 25/06* (2013.01)

(58) Field of Classification Search
CPC .................................. B25C 1/06; H02K 33/12
See application file for complete search history.

(56) References Cited

U.S. PATENT DOCUMENTS 3,434,026 A * 3/1969 Doyle .................... H02K 33/02
327/461
3,924,789 A * 12/1975 Avery ...................... B25C 1/06
227/132

(Continued)

FOREIGN PATENT DOCUMENTS

| WO | WO 2018/104406 A1 | 6/2018 |
| WO | WO 2019/211264 A1 | 11/2019 |
| WO | WO 2019/233845 A1 | 12/2019 |

OTHER PUBLICATIONS

International Searching Authority, International Search Report and Written Opinion in International Application No. PCT/EP2020/085295, dated Feb. 18, 2021.

*Primary Examiner* — Michelle Lopez
(74) *Attorney, Agent, or Firm* — Leydig, Voit & Mayer, Ltd.

(57) ABSTRACT

A tool for working a substrate, the tool having a stator and a working piston, which is intended to move relative to the stator along a working axis, also having a drive, which is intended to drive the working piston from a starting position along the working axis to the substrate, the drive comprising a first piston coil arranged on the working piston and a first stator coil arranged on the stator, and the first piston coil being intended to enter the first stator coil during a movement of the working piston relative to the stator along the working axis.

20 Claims, 5 Drawing Sheets

(56) References Cited

U.S. PATENT DOCUMENTS

| | | | | |
|---|---|---|---|---|
| 4,524,897 A | * | 6/1985 | Bachmann | B25C 1/06 227/142 |
| 4,946,087 A | * | 8/1990 | Wingert | B25F 5/02 227/156 |
| 6,830,173 B2 | | 12/2004 | Barber et al. | |
| 2005/0001008 A1 | * | 1/2005 | Sun | B25C 1/06 227/131 |
| 2005/0167466 A1 | * | 8/2005 | Tsai | B25C 1/06 227/131 |
| 2019/0326805 A1 | | 10/2019 | Mecklenburg et al. | |
| 2021/0060750 A1 | | 3/2021 | Dittrich et al. | |

* cited by examiner

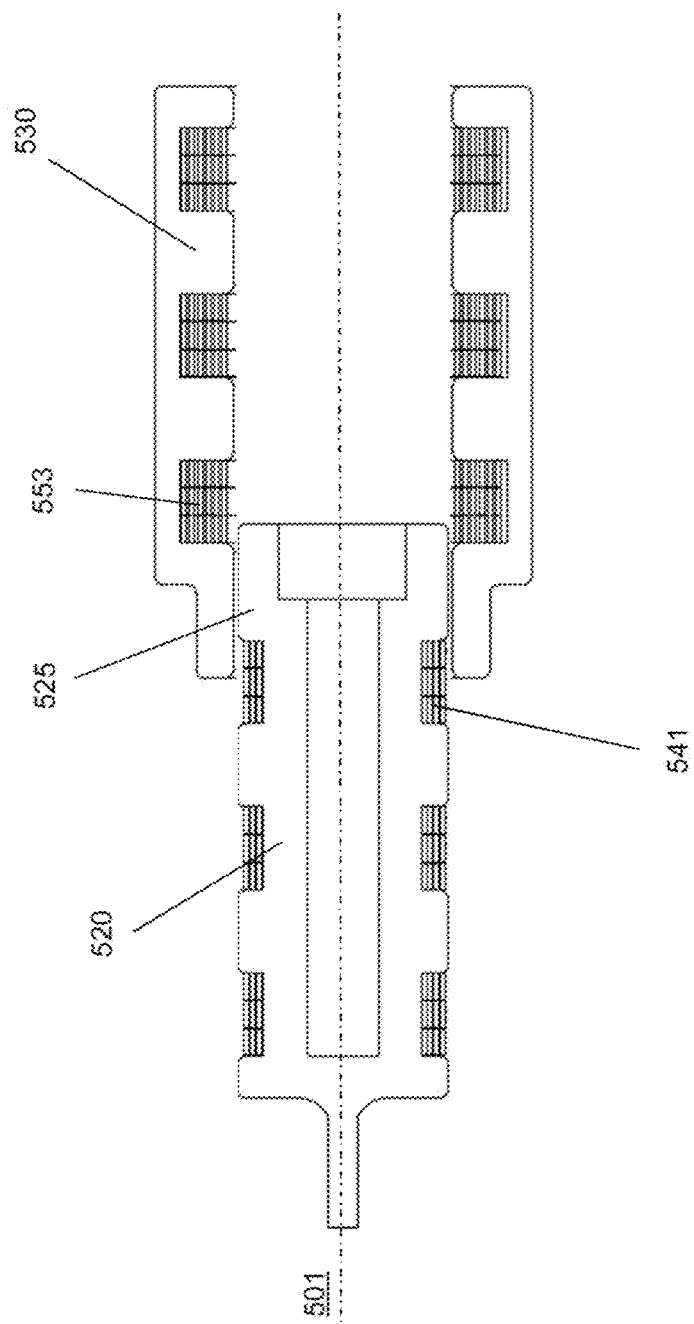

WORKING TOOL

CROSS-REFERENCE TO RELATED APPLICATIONS

This patent application is the U.S. National Stage of International Patent Application No. PCT/EP2020/085295, filed Dec. 9, 2020, which claims the benefit of European Patent Application No. 19218924.9, filed Dec. 20, 2019, which are each incorporated by reference.

The present invention relates to a tool, such as for example a setting tool for driving fastening elements into a substrate.

Such tools often have a working piston, which is intended to move along a working axis. The working piston is driven by a drive, which accelerates the working piston. WO 2018/104406 A1 describes a drive, which has an electrical capacitor, a squirrel-cage rotor arranged on the working piston and an excitation coil, which during rapid discharge of the capacitor is flowed through by current and generates a magnetic field that accelerates the working piston.

Setting tools usually have a receptacle for a fastening element, from which a fastening element received therein is transferred into the substrate along a working axis. For this, the working element is driven toward the fastening element along the working axis by the drive. U.S. Pat. No. 6,830,173 B2 discloses a setting tool with a drive, which has an electrical capacitor and a coil.

The object of the present invention is to provide a setting tool of the aforementioned type with which high efficiency and/or good setting quality are/is ensured.

The object is achieved with a preferably hand-held tool for working a substrate, having a stator and a working piston, which is intended to move relative to the stator along a working axis, also having a drive, which is intended to drive the working piston from a starting position along the working axis to the substrate, the drive comprising a first piston coil arranged on the working piston and a first stator coil arranged on the stator, and the first piston coil being intended to enter the first stator coil during a movement of the working piston relative to the stator along the working axis.

An advantageous embodiment is characterized in that the first piston coil has a first piston coil axis and the first stator coil has a first stator coil axis, which is oriented parallel to the first piston coil axis. The first stator coil axis preferably coincides with the first piston coil axis. Likewise preferably, the first piston coil and the first stator coil can be supplied with current in the same direction in order to generate magnetic fields in the same direction and to accelerate the first piston coil into the first stator coil. Particularly preferably, the drive has a second piston coil arranged on the working piston, which is arranged offset relative to the first piston coil along the working axis and has a second piston coil axis, which is oriented parallel to the first piston coil axis, with the second piston coil and the first stator coil being able to be supplied with current in opposite directions in order to generate opposing magnetic fields and to accelerate the second piston coil out of the first stator coil, while the first piston coil is accelerated into the first stator coil. The first piston coil and the second piston coil are accelerated in the same direction relative to the first stator coil. Particularly preferably, the first piston coil and the second piston coil are electrically connected in series with one another and/or are wound in opposite directions relative to one another.

An advantageous embodiment is characterized in that the first piston coil and the first stator coil can be supplied with current in opposite directions in order to generate opposing magnetic fields and to accelerate the first piston coil out of the first stator coil. The drive preferably has a second stator coil arranged on the stator, which is arranged offset relative to the first stator coil along the working axis and has a second stator coil axis, which is oriented parallel to the first piston coil axis, with the first piston coil and the second stator coil being able to be supplied with current in the same direction in order to generate magnetic fields in the same direction and to accelerate the first piston coil into the second stator coil while the first piston coil is accelerated out of the first stator coil. The first piston coil is accelerated in the same direction relative to the first stator coil and relative to the second stator coil. Particularly preferably, the first stator coil and the second stator coil are electrically connected in series with one another and/or are wound in opposite directions relative to one another.

Likewise preferably, the drive has a second piston coil arranged on the working piston, which is arranged offset along the working axis relative to the first piston coil and has a second piston coil axis, which is oriented parallel to the first piston coil axis, with the second piston coil and the second stator coil being able to be supplied with current in opposite directions in order to generate opposing magnetic fields and to accelerate the second piston coil out of the second stator coil, while the first piston coil is accelerated out of the first stator coil. The first piston coil and the second piston coil are accelerated in the same direction relative to the first stator coil and the second stator coil, respectively.

An advantageous embodiment is characterized in that the first piston coil and the first stator coil are electrically connected in series with one another and/or are wound in the same direction or in opposite directions relative to one another.

An advantageous embodiment is characterized in that the first piston coil has a piston coil outer diameter, with the first stator coil having a stator coil inner diameter, which is larger than the piston coil outer diameter.

An advantageous embodiment is characterized in that the working piston a reluctance element of a soft magnetic material which is accelerated into the first stator coil by the magnetic field that is generated by the first stator coil. The reluctance element preferably projects transversely, in particular perpendicularly, to the working axis from the rest of the working piston toward the first stator coil.

An advantageous embodiment is characterized in that the drive has an electrical capacitor, the first stator coil and/or the first piston coil being electrically connectable to the electrical capacitor in order during rapid discharge of the electrical capacitor to be flowed through by current and generate the magnetic field.

An advantageous embodiment is characterized in that the tool is designed as a setting tool for driving fastening elements into a substrate, having a receptacle which is intended to receive a fastening element, the working piston or the stator being intended to transfer a fastening element received in the receptacle into the substrate along the working axis, and the drive being intended to drive the working piston onto the fastening element along the working axis.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded stud, or the like.

A soft magnetic material in the context of the invention should be understood as meaning a material which has a high magnetic saturation flux density and in particular a small coercive field strength, and thus reinforces a magnetic field penetrating the material. In particular, the soft magnetic material of the stator frame and/or the piston frame has a saturation flux density of at least 1.0 T, preferably at least 1.3 T, particularly preferably at least 1.5 T. In the context of the invention, an electrically conducting material should be understood as meaning a material which has a high specific electrical conductivity, so that a magnetic field passing through the material generates eddy currents in the material. A soft magnetic and/or electrically conductive material preferably consists of a ferromagnetic material, particularly preferably a ferromagnetic metal, for example iron, cobalt, nickel, or an alloy with one or more ferromagnetic metals as the main component.

The invention is represented in a number of exemplary embodiments in the drawings, in which:

FIG. 5 shows a stator/working-piston unit of a tool in a longitudinal section.

Figure 1:
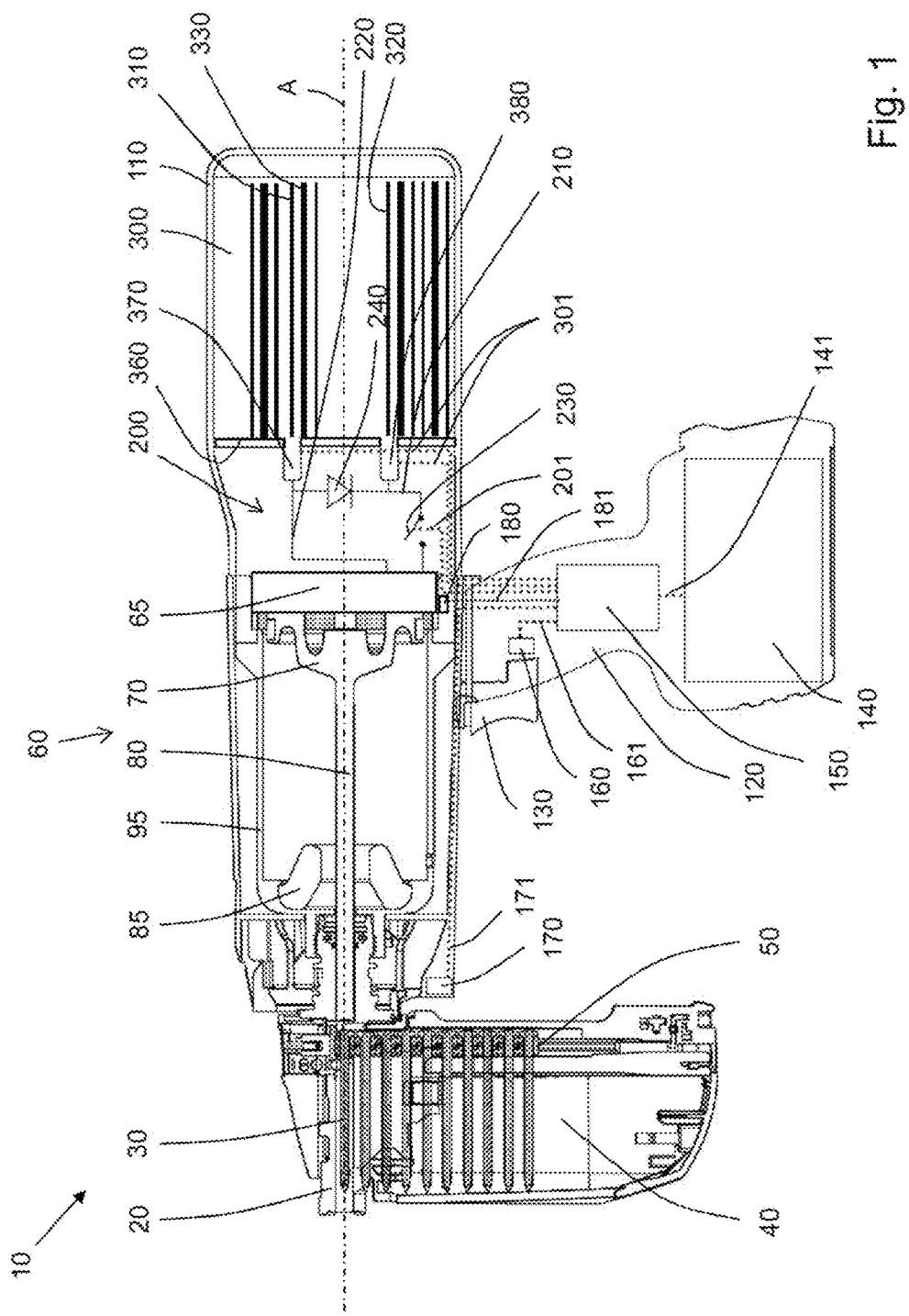
FIG. 1 shows a tool in a longitudinal section.

In FIG. 1, a tool 10 for working a substrate (not shown), which is designed as a hand-held setting tool for driving fastening elements into the substrate, is shown in a longitudinal section. The tool 10 has a receptacle 20 which is formed as a stud guide and in which a fastening element 30 formed as a nail is received in order to be driven into the substrate along a working axis A (to the left in FIG. 1). For feeding fastening elements to the receptacle, the tool 10 comprises a magazine 40 in which the fastening elements are received individually or collectively in the form of a fastening element strip 50 and are transported one by one into the receptacle 20. For this, the magazine 40 has a spring-loaded feed element, not specifically denoted.

The tool 10 has a working piston 60, which comprises a piston body 70 and a piston rod 80. The working piston 60 is intended to transfer the fastening element 30 out of the receptacle 20 along the working axis A into the substrate. In this case, the working piston 60 is guided with its piston body 70 in a guide cylinder 95 along the working axis A. In exemplary embodiments that are not shown, the working piston is guided along the working axis by two, three or more guide elements, for example guide rods. The working piston 60 is in turn driven by a drive 65, which comprises a switching circuit 200 and a capacitor 300. The switching circuit 200 is intended to bring about a rapid electrical discharge of the previously charged capacitor 300 and to feed the discharge current thereby flowing to the drive 65.

The tool 10 also comprises a housing 110, in which the drive 65 is received, a handle 120 with an actuating element 130 formed as a trigger, an electrical energy store 140 formed as a rechargeable battery, a control unit 150, a trigger switch 160, a contact-pressure switch 170, a temperature sensor 180 arranged on the drive 65 and electrical connecting lines 141, 161, 171, 181, 201, 301, which connect the control unit 150 to the electrical energy store 140, the trigger switch 160, the contact-pressure switch 170, the temperature sensor 180, the switching circuit 200 and the capacitor 300. In exemplary embodiments that are not shown, the tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the tool 10 is pressed against a substrate that is not shown (to the left in FIG. 1), a contact-pressure element, not specifically denoted, actuates the contact-pressure switch 170, which as a result transmits a contact-pressure signal to the control unit 150 by means of the connecting line 171. Triggered by this, the control unit 150 initiates a capacitor charging process in which electrical energy is conducted by means of the connecting line 141 from the electrical energy store 140 to the control unit 150 and by means of the connecting lines 301 from the control unit 150 to the capacitor 300 in order to electrically charge the capacitor 300. For this purpose, the control unit 150 comprises a switching converter, not specifically denoted, which converts the electrical current from the electrical energy store 140 into a suitable charge current for the capacitor 300. When the capacitor 300 is charged and the working piston 60 is in its ready-to-set position shown in FIG. 1, the tool 10 is in a ready-to-set state. Since the charging of the capacitor 300 is only brought about by the tool 10 pressing against the substrate, to increase the safety of bystanders a setting process is only made possible when the tool 10 is pressed against the substrate. In exemplary embodiments that are not shown, the control unit already initiates the capacitor charging process when the tool is switched on or when the tool is lifted off the substrate or when a preceding driving-in process is completed.

When the actuating element 130 is actuated, for example by being pulled using the index finger of the hand holding the handle 120, with the tool 10 in the ready-to-set state, the actuating element 130 actuates the trigger switch 160, which as a result transmits a trigger signal to the control unit 150 by means of the connecting line 161. Triggered by this, the control unit 150 initiates a capacitor discharging process, in which electrical energy stored in the capacitor 300 is conducted by means of the switching circuit 200 from the capacitor 300 to the drive 65, by the capacitor 300 being electrically discharged.

For this purpose, the switching circuit 200 schematically illustrated in FIG. 1 comprises two discharge lines 210, 220, which connect the capacitor 300 to the drive 65 and of which at least one discharge line 210 is interrupted by a normally open discharge switch 230. The switching circuit 200 with the drive 65 and the capacitor 300 may form an electrical oscillating circuit. Oscillation of this oscillating circuit back and forth and/or negative charging of the capacitor 300 may potentially have an adverse effect on efficiency of the drive 65, but can be suppressed with the aid of a free-wheeling diode 240. The discharge lines 210, 220 are electrically connected in each case to an electrode 310, 320 of the capacitor 300 arranged on a carrier film 330 by means of electrical contacts 370, 380 of the capacitor 300 arranged on an end face 360 of the capacitor 300 facing the receptacle 20, for example by soldering, welding, screwing, clamping or a form fit. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a retaining device or a clamp.

In exemplary embodiments that are not shown, the free-wheeling diode is connected electrically in parallel with the discharge switch. In further exemplary embodiments that are not shown, no free-wheeling diode is provided in the circuit.

To initiate the capacitor discharge process, the control unit 150 closes the discharge switch 230 by means of the connecting line 201, whereby a high-intensity discharge current of the capacitor 300 flows through the drive 65, which drives the working piston 60 toward the receptacle 20 and the fastening element 30 received therein. As soon as the piston rod 80 of the working piston 60 meets a head, not denoted any more specifically, of the fastening element 30, the fastening element 30 is driven into the substrate by the working piston 60. Excess kinetic energy of the working piston 60 is absorbed by a braking element 85 of a spring-elastic and/or damping material, for example rubber or an elastomer, by the working piston 60 moving with the piston body thereof 70 against the braking element 85 and being braked by the latter until it comes to a standstill. The working piston 60 is then reset to the ready-to-set position by a resetting device that is not specifically denoted.

Figure 2:
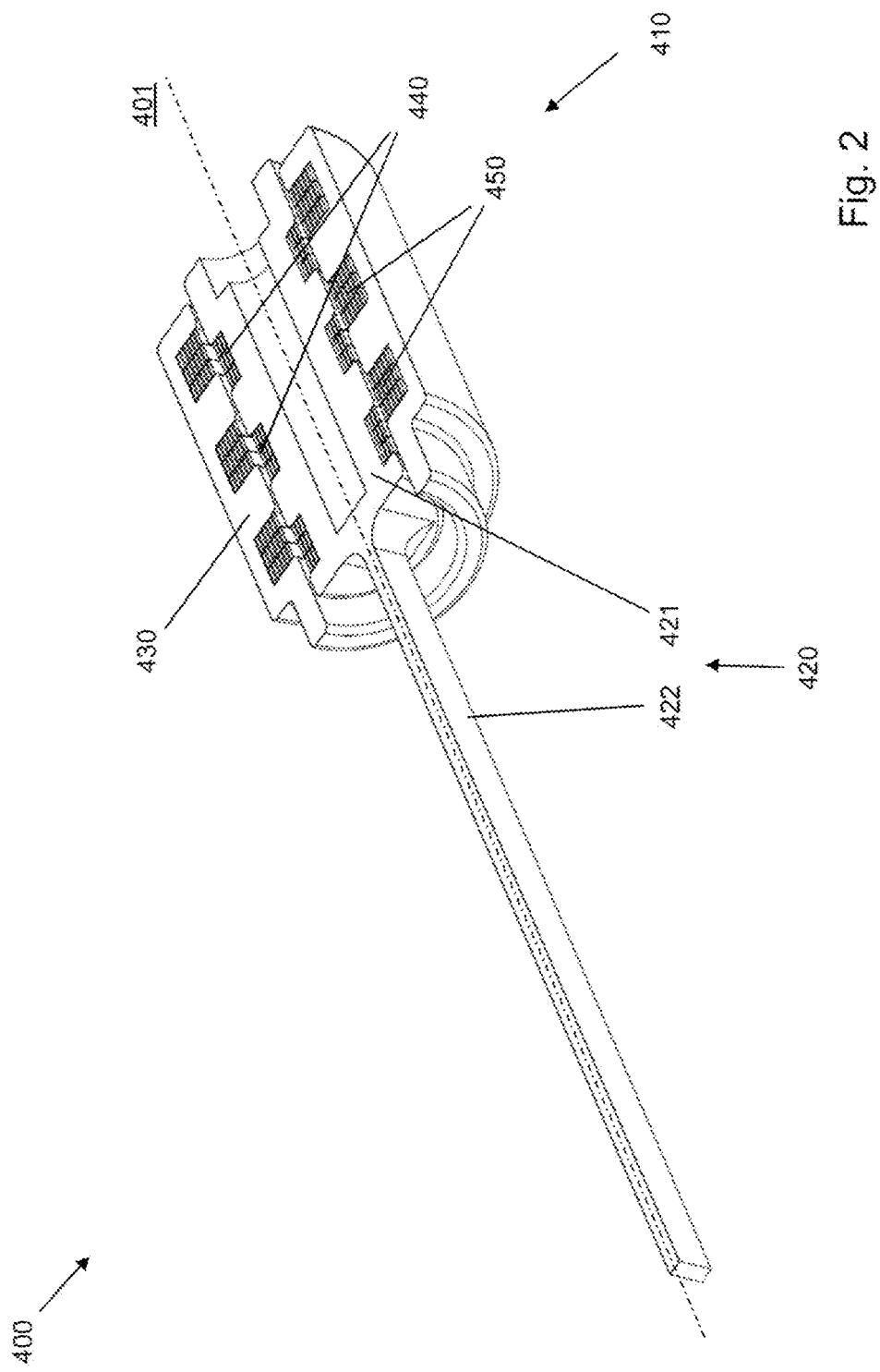
FIG. 2 shows a stator/working-piston unit of a tool in a perspective longitudinal section.

In FIG. 2, a stator/working-piston unit 400 of a tool, for example the tool 10 shown in FIG. 1, is illustrated. The drive/working-piston unit 400 is shown cut away along a working axis 401 and comprises a partially shown drive 410, a working piston 420 and a stator 430. The working piston 420 has a piston body 421 and a piston rod 422 and is intended to move relative to the stator 430 along the working axis 401. The drive 410 is intended to drive the working piston 420 along the working axis 401. For this purpose, the drive 410 comprises a piston coil capacitor (not shown) and a stator coil capacitor (not shown) and a number of piston coils 440 arranged on the working piston 420 and a number of stator coils 450 arranged on the stator.

The piston coils 440 can be electrically connected to the piston coil capacitor in order during rapid discharge of the piston coil capacitor to be flowed through by current and generate first magnetic fields. The stator coils 450 can be electrically connected to the stator coil capacitor in order during rapid discharge of the stator coil capacitor to be flowed through by current and generate second magnetic fields that interact with the first magnetic fields and bring about alternating repulsive and attractive forces between one of the piston coils 440 and one of the stator coils 450 in each case and accelerate the working piston 420 along the working axis 401 out of the stator 430. Repulsive forces between a respective piston coil 440 and a stator coil 450 are brought about for example by the magnetic field generated by the stator coil 450 being opposite to the magnetic field generated by the piston coil 440. For this purpose, electrical current is preferably applied to the piston coil 440 and the stator coil 450 in opposite directions and overlapping in time, in particular at the same time, by the piston coil capacitor and the stator coil capacitor being discharged in a correspondingly timed and coordinated manner, for example controlled by a control unit that is not shown. The piston coils 440 and the stator coils 450 respectively have a piston coil axis and a stator coil axis, which coincide with the working axis 401 and are thus oriented parallel to one another.

Figure 3:
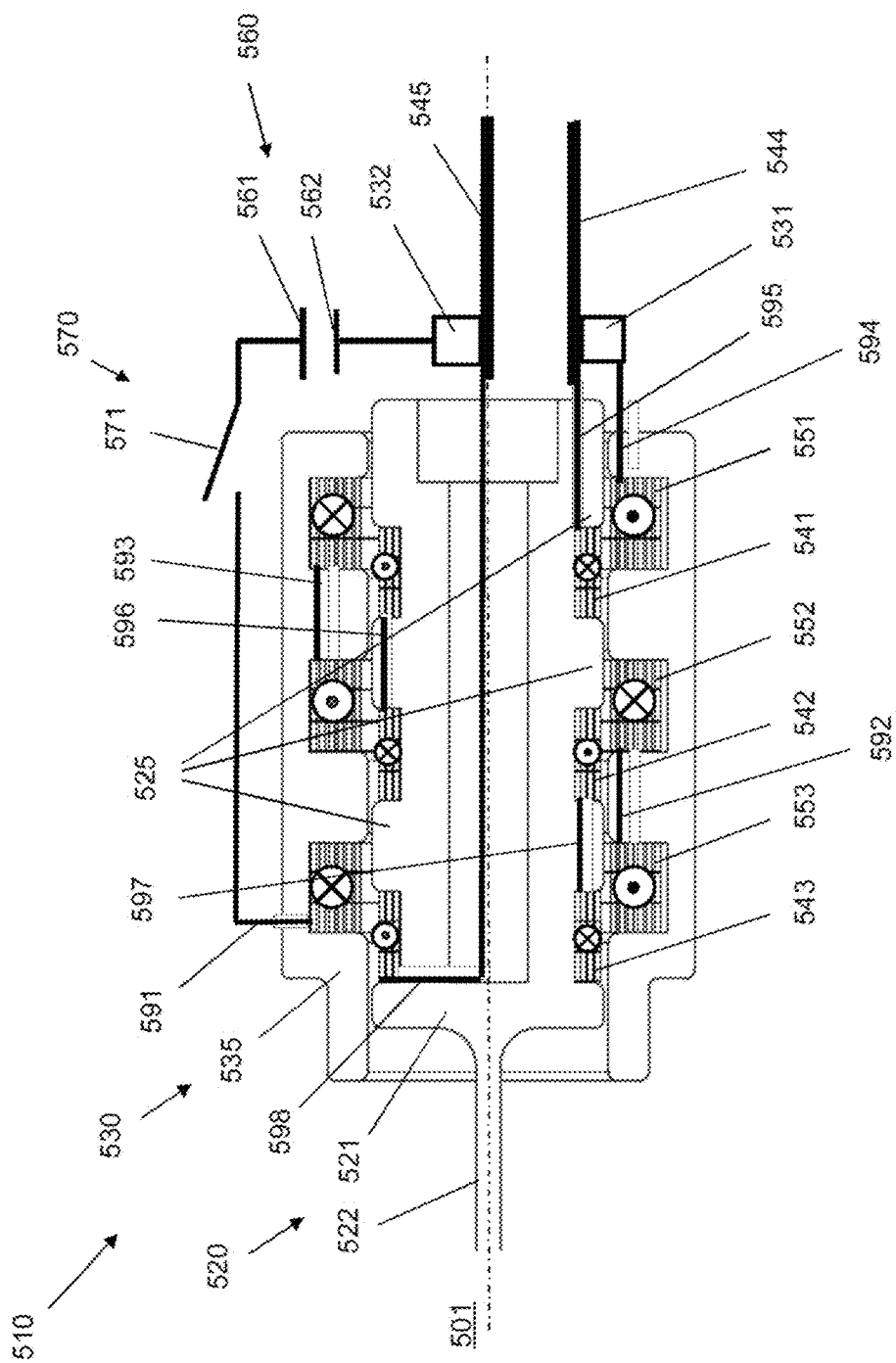
FIG. 3 shows a drive of a tool.

In FIG. 3, a drive 510 of a tool, for example the tool 10 shown in FIG. 1, is illustrated. The drive 510 is shown cut away along a working axis 501 and is intended to drive a working piston 520 with a piston body 521 and a piston rod 522 along the working axis 501 and to move it relative to a stator 530. The drive 510 comprises a capacitor 560 with a first electrode 561 and a second electrode 562, a switching circuit 570 with a switch 571, a first piston coil 541 arranged on the working piston 520, a second piston coil 542 arranged on the working piston 520, a third piston coil 543 arranged on the working piston 520, a first stator coil 551 arranged on the stator 530, a second stator coil 552 arranged on the stator 530 and a third stator coil 553 arranged on the stator 530. The piston coils 541, 542, 543 can be electrically connected to the capacitor 560 in order during rapid discharge of the capacitor 560 to be flowed through by current, so that the capacitor 560 represents a piston coil capacitor. A current flow through the piston coils 541, 542, 543 generates first magnetic fields. The stator coils 551, 552, 553 can also be electrically connected to the capacitor 560 in order during rapid discharge of the capacitor 560 to be flowed through by current, so that the capacitor 560 also represents a stator coil capacitor. A current flow through the stator coils 551, 552, 553 generates second magnetic fields.

The first electrode 561 of the capacitor 560 is electrically connected to an input of the switch 571 and can be charged with respect to the second electrode 562, which is preferably electrically connected to a first ground potential (not shown), for example the negative pole of an electrical rechargeable battery or a battery. An output of the switch 571 is electrically connected, preferably permanently wired, to an input of the third stator coil 553 on an outer side of the third stator coil 553 by means of a first connecting line 591. An output of the third stator coil 553 on an inner side of the third stator coil 553 is electrically connected, preferably permanently wired, to an input of the second stator coil 553 on an inner side of the second stator coil 552 by means of a second connecting line 592. An output of the second stator coil 552 on an outer side of the second stator coil 552 is electrically connected, preferably permanently wired, to an input of the first stator coil 551 on an outer side of the first stator coil 551 by means of a third connecting line 593. An output of the first stator coil 551 on an inner side of the first stator coil 551 is electrically connected, preferably permanently wired, to a first electrical stator contact 531, which is formed as a contact brush and which the stator 530 has, by means of a fourth connecting line 594.

An input of the first piston coil 541 on an inner side of the piston coil 540 is electrically connected, preferably permanently wired, to a first piston contact 544, which is formed as a contact bar and which the working piston 520 has, by means of a fifth connecting line 595. The first piston contact 544 slides in an electrically conducting manner along the first stator contact 531 when the working piston 520 moves along the working axis 501. A first spring (not shown) loads the first stator contact 531 toward the first piston contact 544. In exemplary embodiments that are not shown, a spring additionally or alternatively loads the first piston contact toward the first stator contact. An output of the first piston coil 541 on an outer side of the first piston coil 541 is electrically connected, preferably permanently wired, to an input of the second piston coil 542 on an outer side of the second piston coil 542 by means of a sixth connecting line 596. An output of the second piston coil 542 on an inner side of the second piston coil 542 is electrically connected, preferably permanently wired, to an input of the third piston coil 543 on an inner side of the third piston coil 543 by means of a seventh connecting line 597. An output of the third piston coil 543 on an outer side of the third piston coil 543 is electrically connected, preferably permanently wired, to a second piston contact 545, which is formed as a contact bar and which the working piston 520 has, by means of an eighth connecting line 598.

The second piston contact 545 slides in an electrically conducting manner along a second stator contact 532 when the working piston 520 moves along the working axis 501. The stator 530 has the second stator contact 532, which is formed as a contact brush and is electrically connected to the second electrode 562 of the capacitor 560, in exemplary embodiments that are not shown to the first or a second ground potential. A second spring (not shown) loads the second stator contact 532 toward the second piston contact 545. In exemplary embodiments that are not shown, a spring additionally or alternatively loads the second piston contact toward the second stator contact. The piston contacts 544, 545 do not necessarily contact the stator contacts 531, 532 during the entire movement of the working piston. In some applications, contacting during the first 0.5 ms to 1 ms, in particular during the first 0.6 ms, is sufficient. The piston contacts 544, 545 have a length in the direction of the working axis 501 which for some areas of application is approximately 10 mm to 30 mm.

The piston contacts 544, 545 are rigidly connected to the rest of the working piston 520 and move with the rest of the working piston 520. In exemplary embodiments that are not shown, the first and/or the second stator contact is formed as a slip ring. In further exemplary embodiments that are not shown, the first and/or the second stator contact is formed as a contact rail and the first or the second piston contact is formed as a contact brush or a slip ring. The second piston contact 545 and the second stator contact 532 are arranged radially inside the stator coil 550 and the piston coil 540 with respect to the working axis 501. In exemplary embodiments that are not shown, the first piston contact and the first stator contact are additionally or alternatively arranged radially inside the stator coil and/or the piston coil.

The rapid discharge of the capacitor 560 via the piston coils 541, 542, 543 and the stator coils 551, 552, 553 can be triggered by means of the switching circuit 570, by the switch 571 being closed when the capacitor 560 is electrically charged and the piston coils 541, 542, 543 and the stator coils 551, 552, 553 being electrically connected to the capacitor 560. The electrical current then flows from the capacitor 560 through the switch 571, from the outside to the inside through the third stator coil 553, from the inside to the outside through the second stator coil 552, from the outside to the inside through the first stator coil 551, through the first stator contact 531 and the first piston contact 544, from the inside to the outside through the first piston coil 541, from the outside to the inside through the second piston coil 542, from the inside to the outside through the third piston coil 543 and finally through the second piston contact 545 and the second stator contact 532 to the capacitor 560.

The piston coils 541, 542, 543 and the stator coils 551, 552, 553 respectively have a piston coil axis and a stator coil axis, which coincide with the working axis 501 and are thus oriented parallel to one another. The piston coils 541, 542, 543 and the stator coils 551, 552, 553 are wound in the same direction. In exemplary embodiments that are not shown, the coils are wound in opposite directions. The piston coils 541, 542, 543 and the stator coils 551, 552, 553 are electrically connected in series with one another, that is to say that electrical current flows through them at the same time, a current intensity of the current flowing through the coils 541, 542, 543, 551, 552, 553 being the same for the piston coils 541, 542, 543 and the stator coils 551, 552, 553. In addition, the piston coils 541, 542, 543 and the stator coils 551, 552, 553 preferably have in each case the same number of coil turns, so that the magnetic fields generated by the coils 541, 542, 543, 551, 552, 553 are essentially equally strong.

It is preferred that the piston body 521 consists preferably consists of a soft magnetic material, such as for example iron or an alloy thereof, for example steel. The piston rod 522 also preferably consists of the soft magnetic material and is particularly preferably connected in one piece to the piston body 521, which may increase a stiffness and/or mechanical robustness of the working piston 520. The stator 530 has a stator frame 535, which preferably consists of a soft magnetic material, such as for example iron or an alloy thereof, for example steel. The stator frame 535 surrounds the stator coils 551, 552, 553 and extends in a circumferential direction with respect to the working axis 501. As a result, the magnetic fields generated by the stator coils 551, 552, 553 are intensified in the area of the piston coils 541, 542, 543 and the accelerating force between the stator 530 and the working piston 520 is increased.

The drive 510 is intended to drive the working piston 520 forward from a starting position shown in FIG. 3 along the working axis 501 toward the substrate (to the left in FIG. 3). In the starting position, the first piston coil 541 partially enters the first stator coil 551 and is arranged offset forward relative to the first stator coil. Similarly, the second piston coil 542 and the third piston coil 543 partially enter the second stator coil 552 and the third stator coil 553 and are offset forward relative to the second stator coil 552 and the third stator coil 553, respectively.

In FIG. 3, the coils 541, 542, 543, 551, 552, 553 are provided with circle symbols, a point in the circle representing a current flow out of the plane of the drawing and a cross in the circle representing a current flow into the plane of the drawing. The first piston coil 541 and the first stator coil 551 are supplied with current in opposite directions and therefore generate opposing magnetic fields, so that the first piston coil 541 is accelerated forward out of the first stator coil 551. The first piston coil 541 and the second stator coil 552 are supplied with current in the same direction and therefore generate magnetic fields in the same direction, so that the first piston coil 541 is accelerated forward into the second stator coil 552, while the first piston coil 541 is accelerated out of the first stator coil 551, specifically at the same time. The second piston coil 542 and the second stator coil 552 are in turn supplied with current in opposite directions and therefore generate opposing magnetic fields, so that the second piston coil 542 is accelerated forward out of the second stator coil 552. The second piston coil 542 and the third stator coil 553 are supplied with current in the same direction and therefore generate magnetic fields in the same direction, so that the second piston coil 542 is accelerated forward into the third stator coil 553, while it is accelerated out of the second stator coil 552, specifically at the same time. The third piston coil 542 and the third stator coil 552 are in turn supplied with current in opposite directions and therefore generate opposing magnetic fields, so that the third piston coil 542 is accelerated forward out of the second stator coil 552.

Overall, all of the piston coils 541, 542, 543 are accelerated forward at the same time. The first piston coil 541 is accelerated out of the first stator coil 551 and into the second stator coil 552. The first piston coil 541 is accelerated into the second stator coil 552 and the second piston coil 542 is accelerated out of the second stator coil 552. In exemplary embodiments that are not shown, the first piston coil in the starting position is arranged offset backward relative to the first stator coil and the first piston coil and the first stator coil are supplied with electrical current in the same direction, so that the first piston coil is accelerated into the first stator coil. The first piston coil 541 has a piston coil outer diameter, which is larger than a stator coil inner diameter of the first stator coil 551. As the working piston 520 moves forward, the first piston coil 541 enters the second stator coil 552 and passes completely through the second stator coil 552, as well as through the third stator coil 553.

The working piston 520 has three reluctance elements 525 of a soft magnetic material, which are formed as circumferential projections of the working piston 520. In the starting position of the working piston 520 shown in FIG. 3, the reluctance elements 525 are in each case accelerated into the respective stator coil 551, 552, 553 by a magnetic field that is generated by one of the stator coils 551, 552, 553. This increases an overall forward acceleration of the working piston 520.

As a result of the piston coils 541, 542, 543 entering one another, a power transmission takes place over a relatively long time and/or a relatively long distance covered by the working piston 520, so that a relatively small maximum force is required for sufficient energy transmission. This reduces mechanical loads on all components of the drive 510. In addition, a relatively small maximum current is required. In addition, the resulting waste heat is distributed over several coils, which facilitates cooling of the drive 519.

Figure 4:
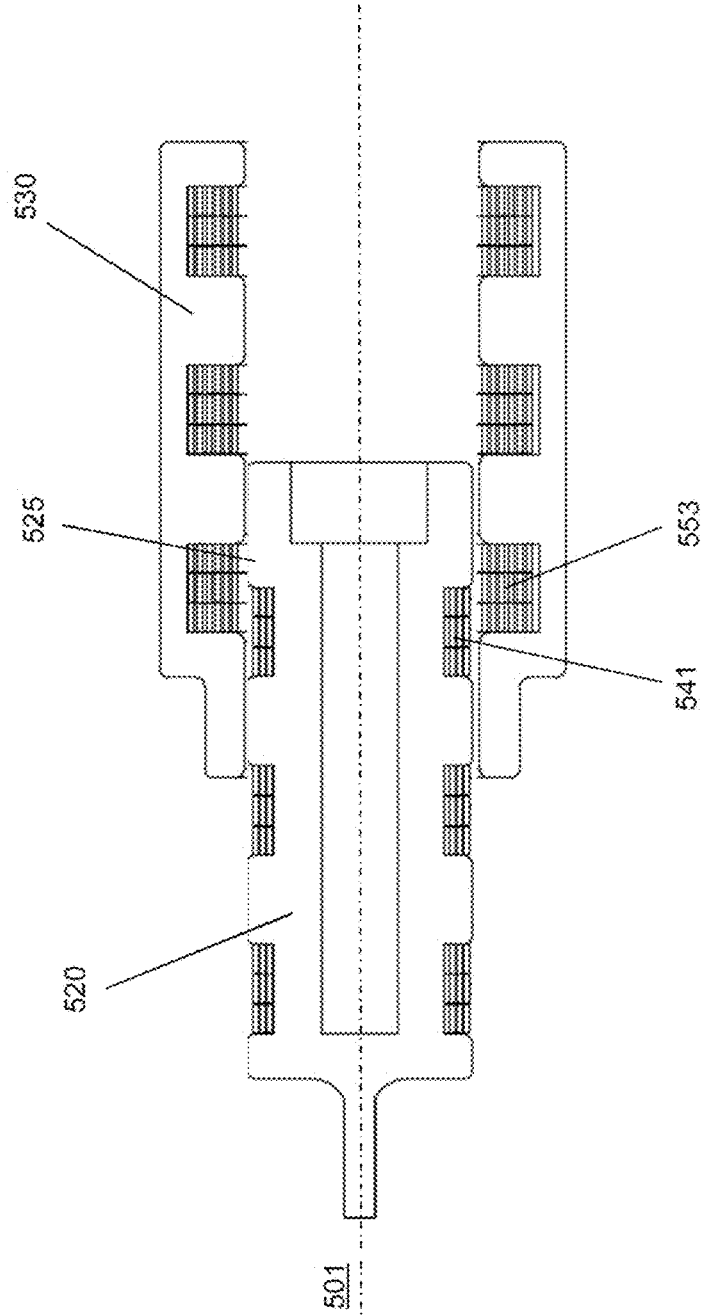
FIG. 4 shows a stator/working-piston unit of a tool in a longitudinal section.

In FIG. 4, the working piston 520 and the stator 530 are illustrated in a first end position of the working piston 520 along the working axis 501. The first piston coil 541 is arranged offset forward relative to the third stator coil 553 along the working axis 501. By supplying current to the first piston coil 541 and the third stator coil 553 in the same direction, it is possible to accelerate the working piston 520 backward in order to move it into the starting position. The serial connection of the coils shown in FIG. 3 is not suitable for this. Rather, polarity reversal or separate energization of the first piston coil 541 or the third stator coil 553 is required.

In FIG. 5, the working piston 520 and the stator 530 are illustrated in a further end position of the working piston 520 along the working axis 501. A first reluctance element 525 is arranged offset to the front relative to the third stator coil 553 along the working axis 501. By applying electrical current to the third stator coil 553, it is possible to accelerate the working piston 520 backward in order to move it into the starting position or at least into the first end position shown in FIG. 4.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It is pointed out that the tool according to the invention can also be used for other applications, for example as a hammer drill or the like.

The invention claimed is:

1. A tool for working a substrate, the tool having a stator and a working piston, which is intended to move relative to the stator along a working axis, also having a drive, which is intended to drive the working piston from a starting position along the working axis to the substrate, the drive comprising a first piston coil arranged on the working piston and a first stator coil arranged on the stator, and the first piston coil being intended to enter the first stator coil during a movement of the working piston relative to the stator along the working axis.

2. The tool as claimed in claim 1, the first piston coil having a first piston coil axis and the first stator coil having a first stator coil axis, which is oriented parallel to the first piston coil axis.

3. The tool as claimed in claim 2, with the first piston coil and the first stator coil being able to be supplied with current in the same direction in order to generate magnetic fields in the same direction and to accelerate the first piston coil into the first stator coil.

4. The tool as claimed in claim 3, the drive having a second piston coil arranged on the working piston, which is arranged offset relative to the first piston coil along the working axis and has a second piston coil axis, which is oriented parallel to the first piston coil axis, the second piston coil and the first stator coil being able to be supplied with current in opposite directions in order to generate opposing magnetic fields and to accelerate the second piston coil out of the first stator coil, while the first piston coil is accelerated into the first stator coil, the first piston coil and the second piston coil being accelerated in the same direction relative to the first stator coil.

5. The tool as claimed in claim 4, the first piston coil and the second piston coil being electrically connected in series with one another and/or wound in opposite directions relative to one another.

6. The tool as claimed in claim 2 the first piston coil and the first stator coil being able to be supplied with current in opposite directions in order to generate opposing magnetic fields and to accelerate the first piston coil out of the first stator coil.

7. The tool as claimed in claim 6, the drive having a second stator coil arranged on the stator, which is arranged offset relative to the first stator coil along the working axis and has a second stator coil axis, which is oriented parallel to the first piston coil axis, with the first piston coil and the second stator coil being able to be supplied with current in the same direction in order to generate magnetic fields in the same direction and to accelerate the first piston coil into the second stator coil while the first piston coil is accelerated out of the first stator coil, the first piston coil being accelerated in the same direction relative to the first stator coil and relative to the second stator coil.

8. The tool as claimed in claim 7, the first stator coil and the second stator coil being electrically connected in series with one another and/or wound in opposite directions relative to one another.

9. The tool as claimed in claim 7 the drive having a second piston coil arranged on the working piston, which is arranged offset relative to the first piston coil along the working axis and has a second piston coil axis, which is oriented parallel to the first piston coil axis, with the second piston coil and the second stator coil being able to be supplied with current in opposite directions in order to generate opposing magnetic fields and to accelerate the second piston coil out of the second stator coil, while the first piston coil is accelerated out of the first stator coil, the first piston coil and the second piston coil being accelerated in the same direction relative to the first stator coil and relative to the second stator coil.

10. The tool as claimed in claim 1, the first piston coil and the first stator coil being electrically connected in series with one another and/or wound in the same direction or in opposite directions relative to one another.

11. The tool as claimed in claim 1 the first piston coil having a piston coil outer diameter, and the first stator coil having a stator coil inner diameter, which is larger than the piston coil outer diameter.

12. The tool as claimed in claim 1, the working piston comprising a reluctance element of a soft magnetic material, which is accelerated into the first stator coil by the magnetic field that is generated by the first stator coil.

13. The tool as claimed in claim 12, the reluctance element projecting transversely to the working axis from the rest of the working piston toward the first stator coil.

14. The tool as claimed in claim 1, the drive having an electrical capacitor, the first stator coil and/or the first piston coil being electrically connectable to the electrical capacitor in order during rapid discharge of the electrical capacitor to be flowed through by current and to generate the magnetic field.

15. The tool as claimed in claim 1, having a receptacle which is intended to receive a fastening element, the working piston or the stator being intended to transfer a fastening element received in the receptacle into the substrate along the working axis.

16. The tool of claim 2, wherein the first stator coil axis coincides with the first piston coil axis.

17. The tool as claimed in claim 3, the first piston coil and the first stator coil being able to be supplied with current in opposite directions in order to generate opposing magnetic fields and to accelerate the first piston coil out of the first stator coil.

18. The tool as claimed in claim 8, the drive having a second piston coil arranged on the working piston, which is arranged offset relative to the first piston coil along the working axis and has a second piston coil axis, which is oriented parallel to the first piston coil axis, with the second piston coil and the second stator coil being able to be supplied with current in opposite directions in order to generate opposing magnetic fields and to accelerate the second piston coil out of the second stator coil, while the first piston coil is accelerated out of the first stator coil, the first piston coil and the second piston coil being accelerated in the same direction relative to the first stator coil and relative to the second stator coil.

19. The tool as claimed in claim 2, the first piston coil and the first stator coil being electrically connected in series with one another and/or wound in the same direction or in opposite directions relative to one another.

20. The tool as claimed in claim 2, the first piston coil having a piston coil outer diameter, and the first stator coil having a stator coil inner diameter, which is larger than the piston coil outer diameter.

* * * * *

UNITED STATES PATENT AND TRADEMARK OFFICE
CERTIFICATE OF CORRECTION

| | | |
|---|---|---|
| PATENT NO. | : 11,999,035 B2 | Page 1 of 1 |
| APPLICATION NO. | : 17/783388 | |
| DATED | : June 4, 2024 | |
| INVENTOR(S) | : Chafic Abu Antoun et al. | |

It is certified that error appears in the above-identified patent and that said Letters Patent is hereby corrected as shown below:

On the Title Page

(72) Inventors:
The correct inventors are, in order, -- Chafic ABU ANTOUN, Buchs (CH); Florian SCHMID, Buchs SG (CH); Albert BINDER, Buchs (CH); Manuel GUT, Göfis (AT); Arno MECKLENBURG, Berlin (DE) --

Signed and Sealed this
Fifteenth Day of July, 2025

Coke Morgan Stewart
*Acting Director of the United States Patent and Trademark Office*